United States Patent
Wang et al.

(10) Patent No.: US 7,627,026 B2
(45) Date of Patent: Dec. 1, 2009

(54) THRESHOLD SETTING USING PIECEWISE LINEAR APPROXIMATION FOR CHANNEL DIAGNOSTIC SYSTEMS

(75) Inventors: Peiqing Wang, Irvine, CA (US); Scott R. Powell, Carlsbad, CA (US)

(73) Assignee: Broadcom Corporation, Irvine, CA (US)

( * ) Notice: Subject to any disclaimer, the term of this patent is extended or adjusted under 35 U.S.C. 154(b) by 577 days.

(21) Appl. No.: 11/094,318

(22) Filed: Mar. 31, 2005

(65) Prior Publication Data

US 2006/0007993 A1    Jan. 12, 2006

Related U.S. Application Data

(60) Provisional application No. 60/584,173, filed on Jul. 1, 2004.

(51) Int. Cl.
    *H04B 3/46* (2006.01)

(52) U.S. Cl. ........................ 375/224; 375/219; 375/230; 370/242; 370/248; 324/534; 324/533; 324/543; 324/539

(58) Field of Classification Search ................ 375/224, 375/219, 230; 370/242, 248; 324/534, 533, 324/543, 539
    See application file for complete search history.

(56) References Cited

U.S. PATENT DOCUMENTS

| | | | |
|---|---|---|---|
| 6,738,480 B1* | 5/2004 | Berthault et al. | 381/66 |
| 6,825,672 B1* | 11/2004 | Lo et al. | 324/533 |
| 6,980,007 B1* | 12/2005 | Lo et al. | 324/543 |
| 2004/0032921 A1* | 2/2004 | Bui | 375/350 |
| 2004/0032931 A1* | 2/2004 | Jimarez | 378/205 |

* cited by examiner

*Primary Examiner*—Mohammad H Ghayour
*Assistant Examiner*—Zewdu Kassa
(74) *Attorney, Agent, or Firm*—Sterne, Kessler, Goldstein & Fox P.L.L.C.

(57) ABSTRACT

A method and apparatus for detecting faults in cables. The invention comprises computing a plurality of thresholds representing a corresponding plurality of values of reflections in the cable; comparing a received reflection to a given threshold; if the received reflection value is greater than the given threshold value, then determining the location of the cable fault; and if the received reflection is not greater than the given threshold value, then taking no further action.

18 Claims, 7 Drawing Sheets

THRESHOLD SETTING USING PIECEWISE LINEAR APPROXIMATION FOR CHANNEL DIAGNOSTIC SYSTEMS

CROSS-REFERENCE TO RELATED APPLICATIONS

This application claims priority to U.S. Provisional Application No. 60/584,173, filed Jul. 1, 2004, entitled "METHODS FOR PERFORMING CHANNEL DIAGNOSTICS," incorporated herein by reference in its entirety.

This invention is also related to the subject matter disclosed in U.S. patent application Ser. No. 10/281,992, filed Oct. 29, 2002, Publication No. 20040013208, entitled "METHOD AND APPARATUS FOR DETERMINING A RECEIVER SAMPLING PHASE FOR USE IN DIAGNOSING A CHANNEL," and commonly owned with the present invention. The disclosure of the '992 application is incorporated herein by reference in its entirety.

BACKGROUND

1. Field of Invention

The present invention relates generally to communication devices and related methods, and more particularly, to such a device using an adaptive filter.

2. Related Art

A known communication system includes a pair of transceivers that communicate with each other over a communication channel, such as a wire or optical cable. On occasion, a fault in the communication channel inhibits communication between the transceivers. It is desirable to be able to determine whether such a fault exists. If such a channel fault exists, it may be difficult to determine useful information about the fault upon basic inspection, such as its location in the channel. It is desirable to be able to determine information about the fault, including its location in the channel and/or the type of fault that has occurred. It is also desirable to be able to determine other information about the communication channel, such as the length of the channel in the absence of a fault. What is needed is a technique to determine the above-mentioned information without having to examine the channel physically.

BRIEF SUMMARY OF THE INVENTION

The present invention is directed to a method and apparatus for detecting faults in cables. The invention comprises computing a plurality of thresholds representing a corresponding plurality of values of reflections in the cable. A received reflection is compared to a given threshold. If the received reflection value is greater than the given threshold value, then the location of the cable fault is determined. If the received reflection is not greater than the given threshold value, then no further action need be taken.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate the present invention and, together with the description, further serve to explain the principles of the invention and enable a person skilled in the pertinent art to make and use the invention. In the drawings, like reference numbers indicate identical or functionally similar elements.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
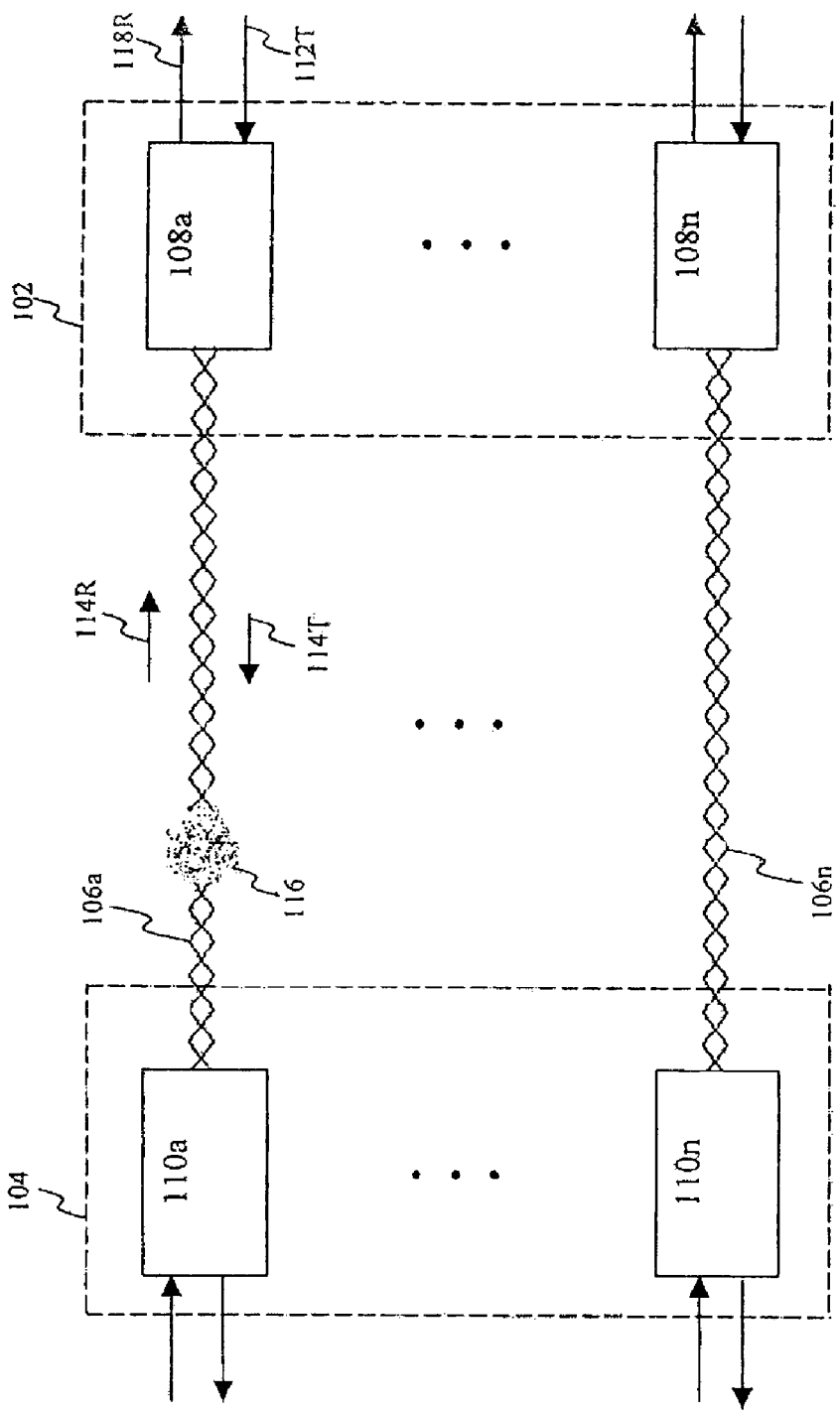
FIG. 1 is a block diagram of an example communication system in which the present invention can operate.

FIG. 1 is an example communication system 100 in which the present invention can operate. System or environment 100 includes a transmitter/receiver (transceiver) assembly 102 and a transceiver assembly 104, that communicate with each other over communication channels 106a-106n. Transceiver assembly 102 includes transceivers 108a-108n, coupled respectively to communication channels 106a-106n. Transceiver assembly 104 includes transceivers 110a-110n respectively coupled to communication channels 106a-106n. Communication channels 106 may include wire and/or optical cables. The terms "channel" and "cable" are used equivalently and interchangeably herein. IEEE standards recommend that an Ethernet cable be no more than 100 m in length. However, installers often will use cables up to 150 m in length.

In operation, transceiver 108a receives an input symbol stream 112T from an external data source, not shown. Transceiver 108a generates a transmit symbol stream or signal 114T from input symbol stream 112T, and transmits the symbol stream to corresponding transceiver 110a over communication channel 106a. Transceivers 108a and 110a are said to be communication "link partners," because they establish a communication link between, and then communicate with, each other over communication channel 106a.

Transceiver 108a receives a receive signal 114R from communication channel 106a. Receive signal 114R may include a transmit signal originated from transceiver 110a. Additionally and/or alternatively, receive signal 114R represents energy from transmit signal 114T that has been reflected back toward transceiver 108a. Transmit signal 114T may be reflected from a channel fault 116 in channel 106a (such as an open or a short in the channel) and/or from an impedance mismatch at a coupling section between channel 106a and transceiver assembly 104. Such reflected energy represents an "echo."

Transceiver 108a receives symbol stream 114R, and derives a corrected, adaptively filtered output stream 118R from symbol stream 114R. The system and method of this invention uses output stream 118R to detect the existence of cable faults and to determine their location along the cable.

Figure 2:
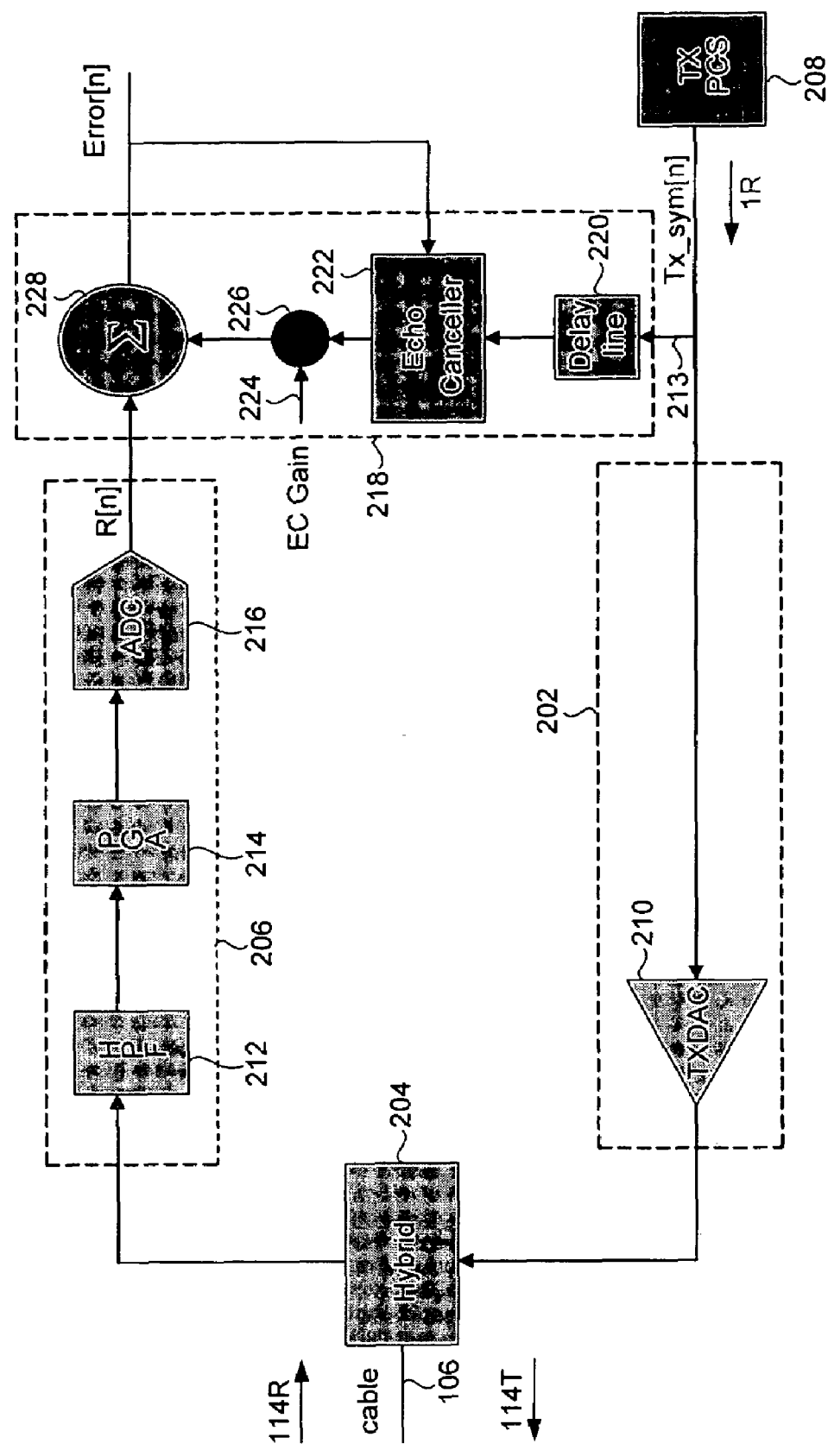
FIG. 2 shows a channel diagnostic system using an Adaptive Echo Canceller with programmable gain tap.

FIG. 2 is a block diagram of an example arrangement of one transceiver 108. Transceiver 108 includes a transmit path 202, a line interface, or hybrid, 204, and a receive path 206.

Transmit path 202 includes a Digital/Analog Converter (TxDAC) 210. Transmit path receives an input from a Transmit Physical Coding Sublayer (TxPCS) 208. Together, PCS 208 and DAC 210 generate the transmit symbol stream or signal 114T from input symbol stream 112T. Hybrid 204 couples transmit signal 114T to communication cable 106. Also, transmit path 202 provides a signal 213 representative of transmit symbol stream 114T to a fault detection circuit 218. Signal 213 is a digital representation of transmit signal 114T.

Hybrid 204 couples receive signal 114R to receive path 206. Receive path 206 includes a high pass filter (HPF) 212, a programmable gain amplifier (PGA) 214, and an analog-to-digital converter (ADC) 216.

Fault detection circuit 218 is coupled between the transmit path 202 and receive path 206. Fault detection circuit 218 includes a delay line 220, which receives input signal 213 from transmit path 202. An adaptive filter/echo canceller (EC) 222 is coupled to delay line 220. The EC output is multiplied with an EC Gain signal 224 in a multiplier 226. The multiplied EC output is applied as one input to a summation node 228. Receive signal R[n] outputted from ADC 216 in receive path 206 is applied as a second input to summation node 228.

Figure 3:
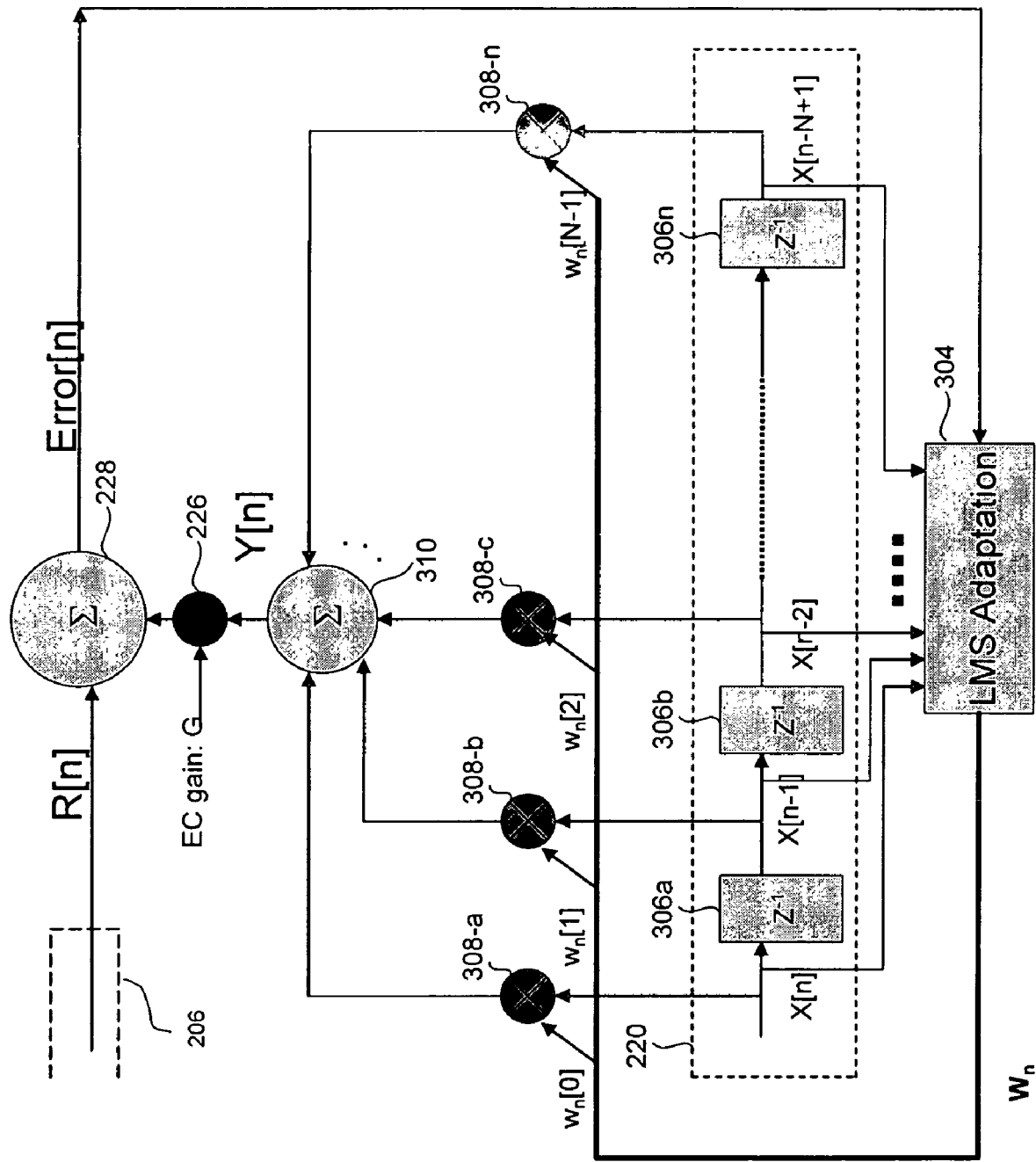
FIG. 3 shows a detailed diagram of the Adaptive Echo Canceller.

FIG. 3 shows a detailed structure of Echo Canceller 222. EC 222 comprises a Least Mean Square (LMS), or other suitable algorithm, adapter 304, a series of delay registers 306a-306n, a corresponding series of multipliers 308a-308n, and a summer 310. The output of summer 310 is modified by a gain G in multiplier 226 and the output of multiplier 226 is applied as one input to summation node 228.

The received signal R[n] comprises a series of discrete sampled time signals. R[n] is the sampled output of ADC 216, indexed by time periods "n". ADC 216 samples the reflection from the receive channel and outputs R[n]. The output of node 228 is an error signal Error[n]. Error[n] is fed back to LMS adapter 304 of Echo Canceller 222, where it is combined with outputs from delay registers 306a-306n. The output of LMS adapter 304 is then combined in multipliers 308a-308n with the TX signal from transmit path 202 via signal path 213, delayed in discrete increments "n" by delay registers 306a-306n. Each multiplier (for example, multiplier 308i) has an associated filter coefficient (for example, filter coefficient $W_n[i]$) that adapts itself to the characteristics of the received data stream such that the filter will converge itself to the same channel Echo response to the transmitted signals. The combined signals are summed in summer 310. The output of summer 310 is combined in multiplier 226 with a fixed gain factor G. The output of multiplier 226 is then applied to summation node 228, where it is subtracted from received signal R[n]. By adapting the EC 222 to realize an approximation of the echo path, a replica of the echo is obtained at the filter output, and the converged filter coefficients reflect the actual echo response of the communication channel. This replica is subtracted from the in-coming signals. The echo response is well defined for a normal channel, and thus the converged filter coefficients are also predictable.

The output of summation node 228

$$RX \text{data} - EC \text{data} = \Delta,$$

where $\Delta$ constitutes the error signals for the Echo canceller's output.

If the gain of the PGA is changed, the RX data and the Error output from the summer are affected. All of the variations that are introduced by the transmit DAC, the hybrid, the analog filter, the PGA and the received ADC will affect the actual Echo Canceller's converged coefficients. The threshold setting that are used for faults detection must account for all of these variations.

The methods described below use the series/set of filter coefficients mentioned above. According to one aspect of the present invention, these filter coefficients adapt to channel conditions, and when interpreted properly, provide valuable information about the channel, including specifically the detection and location of cable faults.

In the case of a fault, due to the mismatch of impedance of the channel, the reflection will be larger than the normal cable reflection. This will cause some tap coefficients to converge to higher values. The channel diagnostic system will detect the cable faults by identifying those tap coefficients that exceed their normal converged values.

The embodiments of the invention provide a method and systematic approach for setting up a set of filter coefficient thresholds during the channel diagnostic process. First, an optimal threshold is set for each tap of the filter based on the exponential behavior of the reflection due to the channel fault. The exponential function of the threshold for each tap can be well defined and estimated from transmission line theory and characteristics of the channel. In contrast, previous threshold setting methods used trial and error based on the measurement of the reflection, and their staircase approach was a very rough estimation of the exponential behavior of the reflection.

Previous threshold setting methods required adjustment for each threshold setting. Depending on how many thresholds are used in the present invention (usually at least 10-15 threshold settings to have reliable detection), it is very time consuming to adjust all the thresholds and their sensitivity and variations to the system used in the measurement could be an issue.

Another aspect of the present invention only requires setting up the initial value of the threshold at the starting tap. The threshold of each following tap can be computed based on the starting tap value. This makes the threshold setting a lot easier and a very optimal threshold setting can be achieved that maximizes the noise margin for detection. This is in contrast to previous methods, where one threshold was used for a large number of taps (from 10 to 20 taps in general). The threshold setting could not be made optimal for each tap, and the noise margin of the detection was degraded.

The present invention uses piecewise linear fitting, which is a very good approximation for this exponential behavior of the optimal threshold setting and it can also be implemented very efficiently in the VLSI design.

Echo Canceller Gain Control

Normally, in a no-fault condition, the echo canceller operates with very low reflection. Thus, the taps do not have to be sized to contain a very large number. The hardware can then be optimized on the assumption that the reflection number will not be very high at any of the taps. This reduces the hardware requirements of the echo canceller. However, if the echo canceller is going to be used to also detect faults, the echo canceller has to be able to accept larger numbers for the higher reflection values that faults cause. To scale the echo canceller up in size to accept the higher numbers requires significantly more hardware than is required for normal operation. Because of the infrequency with which the cable diagnostics is run, it is preferred to minimize extra hardware with its increased cost and overhead.

If it is known in advance that the system will be looking to detect large reflections indicative of a fault, the reflections can be pre-divided before they get to the echo canceller. The value received by the echo canceller will be a fraction of the actual value and will be within the normal operating range of the echo canceller. One would not want to do this division in normal operation, because the reflection values would be then too low to be useful to the echo canceller. However, in fault detection mode, the large reflections are pre-scaled so that they fit within the dynamic range of the echo canceller.

In normal operation, the reflections that come back from a good cable are small. For this reason, the echo canceller has a relatively small dynamic range. Because of this, a large fault reflection will be outside the range of the EC and will return an error signal because of tap overflow. The output of the EC will then appear as a normal reflection. The way to overcome this problem is to scale the fault reflection down to a value that fits within the range of the echo canceller.

In one example, the original output of the EC is:

$$y(n) = \sum_{i=0}^{N-1} W_n[i] * x[n-i]$$

where $w_n(i)$ are the filter coefficients and $x(n-i)$ are the delayed tap inputs, which include the current and previous transmitted data over the channel. The adaptive algorithm will take the Error[n] to converge the $w_n(i)$.

Error[n] is computed as follows:

$$Error[n] = R[n] - y(n)$$

where R[n] is the ADC output of the received data from the same channel.

$$R[n] = rd1(n) + rd2(n) + \text{additive noise}.$$

The additive noise may be assumed to be Additive White Gaussian Noise (AWGN) with zero mean. This will contribute some small tap noise for the converged filter coefficients, and may be ignored to simplify the derivation. rd1(n) is the echo from the same channel (cross-talk between the channels is ignored because during the channel diagnostic process, data is sent only for the current channel to be diagnosed).

In one example, the echo response of the channel can be modeled as a linear finite impulse response (FIR) filter as:

$$d1(n) = \sum_{i=1}^{N-1} h(i) * x(n-i)$$

h(i) are the echo impulse response. rd2(n) is the received signals coming from another channel connected to the cable, which can be a link pulse, or other data traffic. So the Error[n] will be $$Error[n] = \sum_{i=0}^{N-1} [h(i) - w(i)] * x(n-i) + rd2(n).$$

In one example, the actual adaptation algorithm uses the mean-square error (MSE) as the performance function to converge the filter coefficients. There is no correlation (or very minor correlation) between x(n) and rd2(n). Therefore one can simply take $E[x(n-i)*rd2(n)]=0$ as a good approximation, and the result of the MSE is the following ( $E[\cdot]$ denotes statistical expectation):

$$MSE = E[|Error[n]|^{\wedge}2]$$

$$= E\left[\left|\sum_{i=1}^{N-1}[h(i)-w(i)]*x(n-i)\right|^{\wedge}2\right] + E[|rd2(n)|^{\wedge}2].$$

To determine an optimal $w_n(i)$ that will minimize the MSE, a partial derivative of the MSE is applied with respect to every tap weight (the coefficients of each tap) and this derivative is set to zero, which gives:

$$w(i) = h(i) \text{ for } i=0, 1, \ldots, N-1.$$

This shows that the converged value of the EC will be a good estimation of the real channel echo response. However, in the case of overflow during the convergence of w(i) for the reasons discussed above, some w(i) may be quite different from its optimal value h(i) that it is supposed to converge.

In one embodiment, a gain tap is introduced at the output of the EC to increase the dynamic range of EC coefficient range. By adding a digital gain tap at the output of the EC, the Error[n] is:

$$Error[n] = R[n] - G*y(n), \text{ where } G \text{ is a gain tap}.$$

$$Error[n] = R[n] - G*\sum_{i=0}^{N-1} w(i)*x(n-1)$$

It can also be written as:

$$Error[n] = R[n] - \sum_{i=0}^{N-1} G*w(i)*x(n-i)$$

$$= R[n] - \sum_{i=0}^{N-1} w'(i)*x(n-i)$$

where $w'(i) = G*w'(i)$ and the same MSE equation with this substitution of w(i):

$$MSE = E[|Error[n]|^{\wedge}2]$$

$$= E\left[\left|\sum_{i=0}^{N-1}[h(i)-w'(i)]*x(n-i)\right|^{\wedge}2\right] + E[|rd2(n)|^{\wedge}2].$$

so the optimal converged value of w(i) will be $$w'(i) = G*w(i) = h(i).$$

and the actual EC coefficients w(i) will converge to their optimal value:

$$w(i) = h(i)/G.$$

The gain G can be programmed to be $2^k$ (k=0, 1, 2, . . . ) to simplify implementation.

$$k=0: w(i) = h(i);$$

$$k=1: w(i) = h(i)/2;$$

$$k=2: w(i) = h(i)/4.$$

Since the gain tap G can have the form of $2^k$, the actual implementation of the digital multiplication is an arithmetic shift. By making G=2 or 4, more dynamic range is possible for w(i) to converge with the same word-length implementation, and the overflow issue can be solved.

The echo canceller includes a set of coefficients that will converge to the channel's echo impulse response. By comparing this set of filter coefficients with a predetermined set of filter coefficient thresholds, channel faults that add additional reflection due to channel impedance mismatch will be detected.

The above embodiments and examples describe a solution for the overflow issue that could occur during the convergence of the adaptive filter used for a channel diagnostic system. By introducing a gain tap at the output of the EC filter, a dynamic convergence range of the filter coefficients is increased without increasing the fixed-point word length of the coefficients that is already optimal for the normal data communication.

The above embodiments and examples apply an original EC filter design to the cable diagnostic system without changing the word length of the filter coefficients and the corresponding arithmetic logic. Adding the gain tap at the output of the EC filter might add more noise (some noise enhancement and also the increased quantization noise due to the gain tap) during the convergence of the filter coefficients, which will add some tap noise to the final converged coefficient values. However, since the system is only required to detect any reflections due to the channel faults, good noise margin is possible for the detection as long as there is no overflow during the convergence of the EC.

There are generally three main types of cable faults. These include a severed connection or "open circuit," a fused connection or "short circuit," and a fused connection between two channels or "short between pairs." Open circuit and short circuit faults are collectively referred to as "open/short" faults. The present invention relates in part to determining whether a fault has occurred, and, if so, whether the fault is an open/short or a short between pairs. Another aspect of the invention relates to determining the location of the fault along the cable. Still another aspect of the invention relates to determining cable length for a good cable (that is, a cable that does not exhibit a fault condition).

A cable of the type to which this invention is directed can be considered to be similar to a transmission line. Therefore, the properties of transmission line theory, especially those concerning reflection, apply to these cables. Signals transmitted through the cable will be subject to at least minimal reflection as a result of inherent mismatch between the cable and the termination, either at another cable connection or another connector. The reflection can be detected on the receive path 206 of transceiver 108. A fault will generally be detected as a larger reflection than a reflection from a good cable.

Cable diagnostics are typically undertaken when a problem is detected with a channel or cable as a whole. At that time, the user (usually the system administrator) will be alerted to initiate a diagnostic sequence to determine whether there is a fault in the cable. This is done by sending a test signal through the cable and detecting the reflection that is returned.

The existence of a fault in a cable can be determined by comparing the filter coefficients at each tap to a predetermined set of filter coefficient fault thresholds that set a limit on reasonable values of the filter coefficients corresponding to non-fault channel conditions. An abnormally enlarged filter coefficient that exceeds one such predetermined threshold indicates a fault in the channel. Also, a good approximation of the distance between the filter (in the transceiver) and such an indicated channel fault can be calculated based on the tap number corresponding to the enlarged coefficient. In addition, when no channel fault exists, a good approximation of the channel length can be determined by comparing the filter coefficients to a different set of predetermined thresholds indicative of channel length when no channel fault exists, and finding the tap number of any coefficient that exceeds one of these thresholds.

The filter coefficients exceed the above mentioned thresholds for the following reason. Channel faults (and similarly, the coupling between the end of the channel and the remote transceiver or link partner) cause an impedance mismatch in the channel. Thus, the fault (or channel-end coupling) returns substantial reflections of the transmitted signal back to the receive path 206.

The adaptive filter attempts to remove the effects of the reflections or echoes by enlarging some of the filter coefficients. The longer the distance between the transceiver (for example, transceiver 108a) and the channel fault, the longer it takes for the reflection to return to the adaptive filter, and the higher the tap number(s) of the enlarged coefficients. Also, the longer the distance between the transceiver and the channel fault or coupling, the smaller the amplitude of the reflected signal, and the less the corresponding filter coefficient values are enlarged.

Another way of looking at this process is as follows. Under normal conditions, the adaptive filter receives the transmitted signal from its associated transmitter, as the line interface initially couples the transmitted signal to the channel. By storing delayed copies of the transmitted signal in the filter delay elements, and adjusting the corresponding coefficient values, the adaptive filter adjusts to the "timing" of the transmitted signal in the channel. Such timing of the transmitted signal is inherently represented by the adapted filter coefficients.

With regard to channel length determinations, when an echo of the transmitted signal arrives at the adaptive filter relatively soon after the initial transmission of the transmitted signal, one or more of the relatively earlier filter coefficients (that is, filter coefficients corresponding to smaller tap numbers) will self-adjust to a larger coefficient value, that exceeds its respective threshold. The methods described below will then report that the cable is relatively short because of the "soon after" arrival of the echo.

On the other hand, when an echo of the transmitted signal arrives at the adaptive filter a relatively long time after the initial transmission of the transmitted signal, then one or more of the relatively later (higher tap number) filter coefficients will have a higher-than-normal value that exceeds the respective threshold, and the method will report a relatively longer cable length due to the later arrival of the echo.

Open/Short Fault Detection

Fault testing is done at the option of the user. System diagnostics can be run periodically or aperiodically, as needed by the user, typically the system administrator. The system can also be set to run fault testing diagnostics automatically when the system attempts to establish a connection or link to transfer data and is unable to do so. The system automatically assumes that there is a fault and will switch into auto-detection mode.

A first set of thresholds indicative of channel faults (i.e., open/short thresholds) is used to determine the existence of and distance to a channel fault, while a possibly different second set of thresholds indicative of channel length (i.e., length thresholds) is used to determine a channel length when no channel fault has been detected. Due to the nature of adaptive filter coefficients w[i], poor results may be obtained if all of the filter coefficients w[i] are compared to a single threshold. This is due to the fact that filter coefficients w[i]

corresponding to larger tap numbers (and thus, larger time delay) tend to have smaller absolute values after they are properly converged. Thus, a set of thresholds including thresholds of different values is used in the present invention. In setting threshold values, one must take into consideration the values of potential fault reflections. If the threshold is set too low or too high, the value of the fault reflection could produce an error reading. If the threshold is set too low, some small reflection due to imperfect termination or some variations due to the return loss of the cable plus any noise with the converged EC coefficients will be larger than this too low threshold and will result in a false detection. Conversely, if the threshold is set too high, it would miss detecting lower value fault reflections due to the distance from the signal source or due to the fact that the fault is caused by a short between wires (a "short between pairs"), which generally produces lower value faults than open/short faults.

In a prior system, a staircase approach was used to determine the open/short thresholds and length thresholds. Filter coefficients w(i) were divided into three or four groups, and each group had its own corresponding fixed threshold for open/short thresholds and length thresholds, with each group being somewhat smaller than the threshold for the previous group. Thus, the different threshold values followed a staircase of values. The number of groups was related to the number of registers available to store the coefficients. Cost and space restrictions limited the number of groups to three or four.

This prior system of staircase groups of filter coefficients produced a less than satisfactory response to fault detection. Each group covered a large number of taps. For example, in a typical system with 190 taps covering a 150 m cable, each of the four groups would have to span 47-48 taps over a distance of 37.5 m per group. Given the fall off of reflection amplitude over distance, the reflections returning from the furthest taps in a group are significantly smaller than reflections returning from the nearest taps in that group. A threshold value that works for the closer taps may well miss faults from the farther taps.

Theoretically, the threshold should follow cable attenuation. According to standard transmission-line theory, it is possible to compute how attenuation changes with cable length. The amplitude of the channel reflection is an exponential decay function of cable length, which is a linear function of the tap number of the echo canceller. The EC coefficients, which are the estimation of the channel reflection, should also follow this exponential function with the tap number. This exponential function can be described as follows:

$$\text{Threshold} = A^* \exp(-B^* \text{tap})$$

where A and B are constants that depend on the particular cable properties and are empirically determined based on fundamental transmission line theory.

Ideally, one would like to have one threshold for each tap. However, this becomes very expensive, because each threshold requires a register to store the threshold value. This becomes expensive from both a hardware cost and a "real estate" cost viewpoint. Therefore, a way must be found to cost-effectively use fewer registers while still obtaining reasonably accurate readings.

Figure 4:
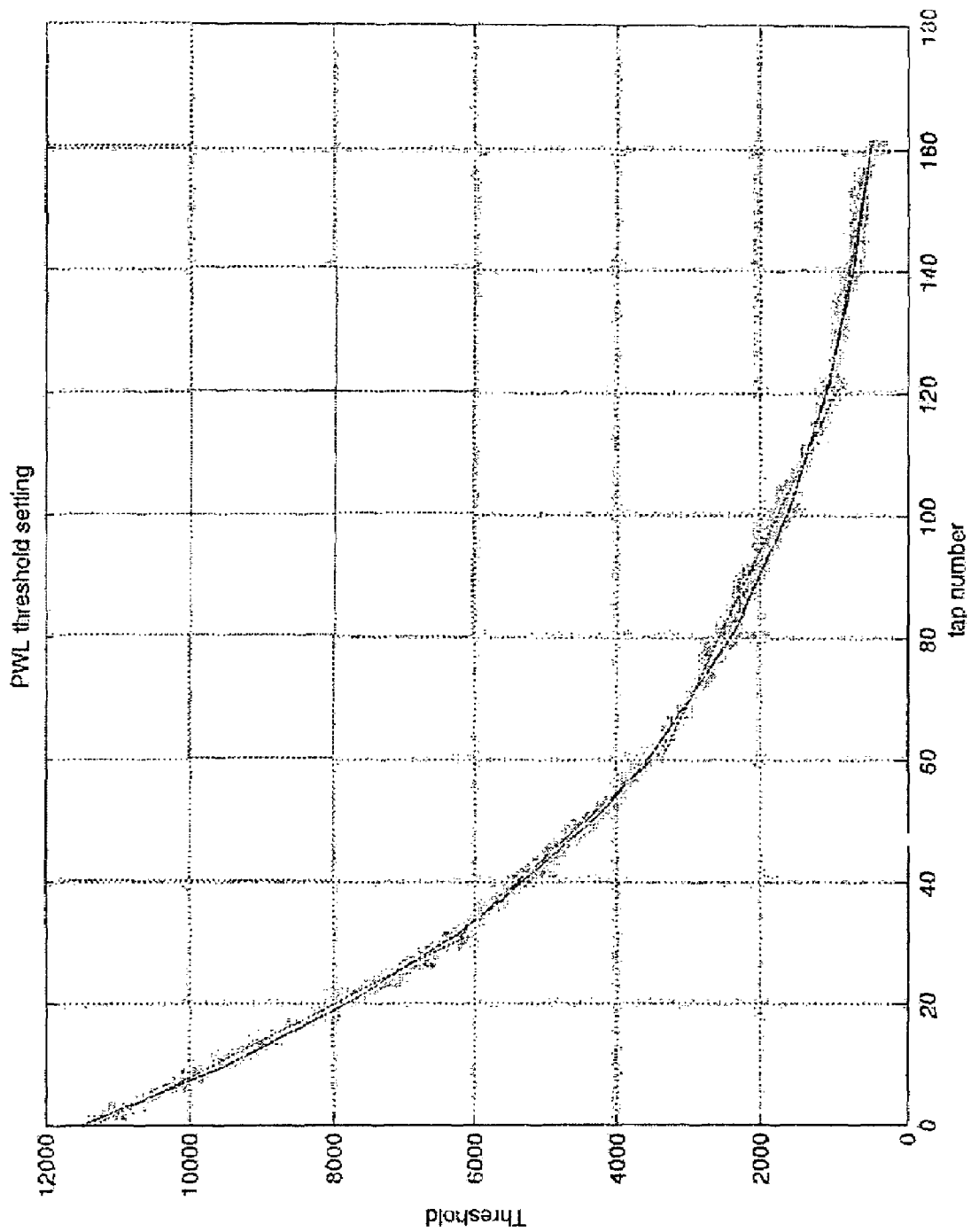
FIG. 4 shows a graph of the piecewise linear function threshold settings.

The present invention solves the problem by using a piecewise linear function (PWL) to approximate the exponential change in threshold with cable length. Using a piecewise linear function, it is only necessary to store two values for each cable segment. This is a considerable improvement over the stepwise arrangement which required one register for each step. Using the piecewise linear function, only two registers are required for each cable segment, one to store each end value needed to compute the line. Using the piecewise linear function, one can get very close to a good approximation at each tap by dividing the whole cable length into a few segments (i.e. 4 segments to cover 0-150 m) and using a linear approximation for each segment of cable Referring to the graph of threshold settings shown in FIG. 4, the equation used is y=a*b+c.
1. For cable length estimation $$\text{length} = a_1^* \text{tap number} + c_1$$

Thus, cable length is a linear function of the tap number.
2. For threshold (to compute PWL)

$$\text{threshold} = \text{tap } a(i)^* \text{tap number} + \text{tap } b_{(i)}$$

where i=0, 1, 2, 3 ..., n

Figure 5:
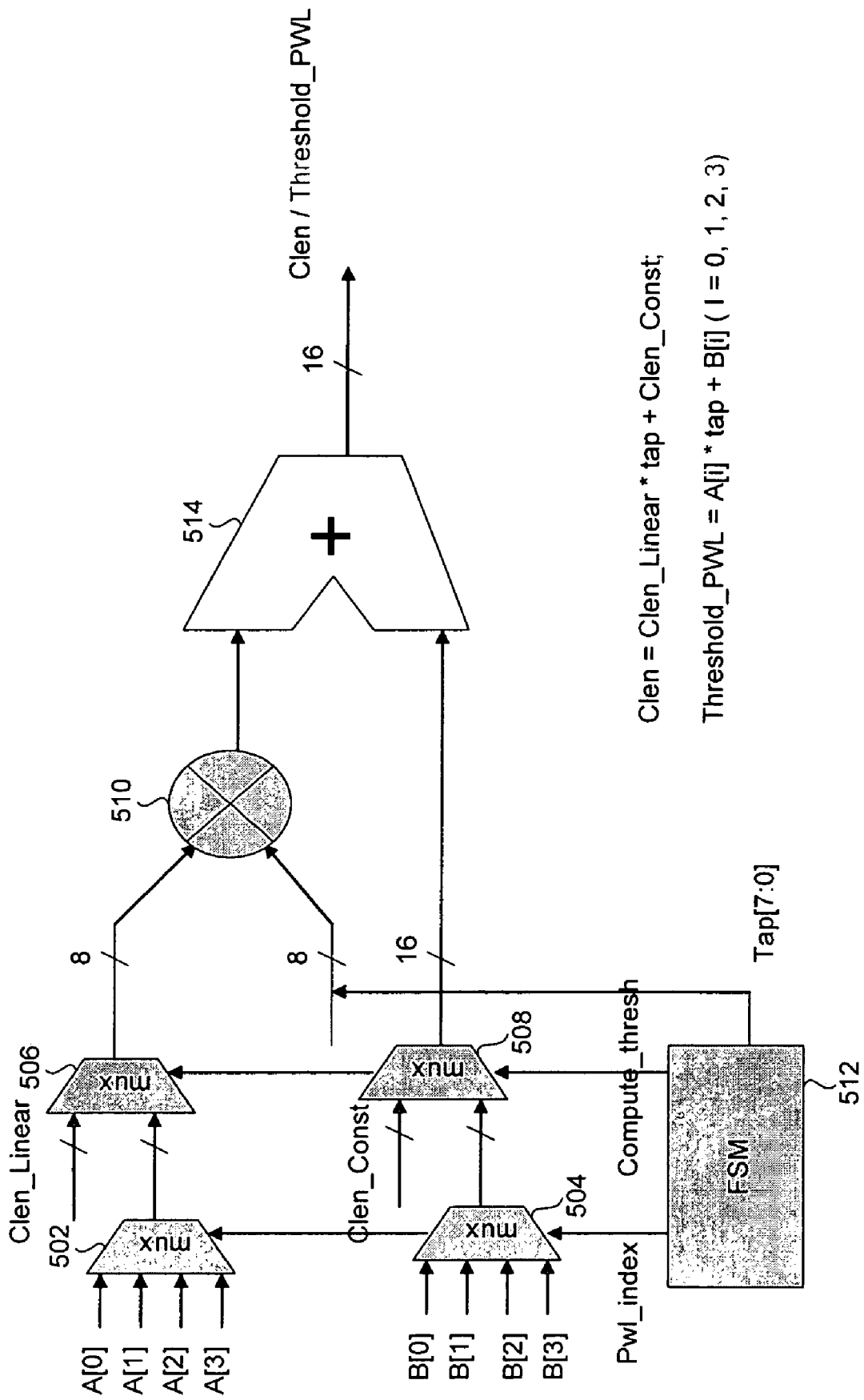
FIG. 5 shows a data path of resource sharing to compute the Piecewise Linear Function for each tap threshold.

The same hardware, an example of which is shown in FIG. 5, discussed below, is used to estimate length and threshold. The controller controls the input multiplexers (MUXes) to select the inputs to the multiplier and adder. The inputs come from the memory registers (not shown) where the threshold values are stored. In a first time window, the threshold will be calculated, and in a second time window the length will be computed.

Sequentially, the process starts from tap 0. At each tap for the current cable segment, the same linear parameters $a_i$ and $b_i$ for that tap are selected. This will set the threshold at that tap for the current segment. Then the threshold for that tap is compared to the reflected signal. If the reflected signal is greater than the threshold, this is an indication of a fault. It is also possible to determine the end of the cable by this method. Due to mismatches in cable and termination impedances, a termination appears as a fault and sends back a smallr eflection that will exceed the thresholds that are predetermined for the cable length detection.

The simplified algorithm is as follows:
1. Compute the threshold at each tap using PWL.
2. Use the computed threshold to detect an open/short (i.e., compare the threshold to the tap weight or coefficient (w(i))). For each tap number, there is a corresponding tap weight.
3. If w(I is less than the threshold at the tap, then terminate.
4. If w(i) is greater than the tap threshold, then stop searching and compute the tap length.

In an example implementation, a cable includes four pairs of wires. This diagnostic process is performed for each pair of wires of the four-wire pair in the cable, because there could be a break in one of the pairs but not all of them.

The process for comparing EC coefficients to thresholds must be done over several taps, for example, 5-10 taps. Due to dispersion, it may be necessary to take a reading from several adjacent taps to get an accurate determination of whether there is a real peak or merely an aberration.

A good approximation and efficient implementation in ASIC design of this exponential function uses PWL functions to approximate the computation of the exponential function in different regions of taps. For each group of taps, the following linear function is used:

$$\text{Threshold}(\text{tap}) = A(i)^* \text{tap} + B(i)(i=0, 1, \ldots N)$$

where N is the number of groups of taps and A(i) and B(i) can be found by using a linear fitting method. A different linear function is used to estimate the thresholds for each group. In contrast, in conventional methods each threshold had to be determined and stored separately. Or, as in the previous system described above, a small group of thresholds was used for a large group of taps. Using the method according to the above embodiments and examples, many thresholds can be represented by only two parameters.

In one example using a full duplex system, inaccurate hybrid echo cancellation can cause a large deviation of the threshold setting for the taps between 0-10. To circumvent this practical issue, a constant threshold setting threshold0 is added for taps 0-10 instead of using PWL approximation.

FIG. 5 shows the resource sharing arrangement for computing piecewise linear function (PWL) threshold and cable length. One of the features of the present invention is the efficient use of hardware to minimize the amount of components that are required to perform the desired functions.

A linear function can be used to estimate cable length. Two constants are needed: $C_{len\_linear}$ and $C_{len\_Const}$. These are each programmable parameters. The PWL function is used to determine the optimal threshold for each tap. Theoretically, the optimal threshold determination should be an exponential function. However, it is not cost effective to implement an exponential function in the available hardware. Therefore the present invention makes use of PWL to approximate the exponential function.

A controller controls in real time when the cable length for a broken cable must be computed and when the thresholds must be computed. Using PWL, the threshold for each tap is first computed. Then the reflections are compared to the computed thresholds. If a cable fault is detected, then the cable length is computed to determine the location of the fault along the cable. The data path is used to compute the threshold for each tap. The thresholds for each tap are computed using PWL and looking at segments. For each segment there is a different A(n) and B(n). A and B are programmable parameters which are used to compute the PWL of the threshold.

Referring to FIG. 5, a first multiplexer (MUX) 502 selects predetermined programmable parameters A(0)-A(3). A second multiplexer (MUX) 504 selects predetermined programmable parameters B(0)-B(3). Depending on the tap number to be calculated, any one of A(0)-A(3) and any one of B(0)-B(3) are selected. The taps are divided into four groups. For each group, a different A(i) and B(i) parameter are selected. The selected A parameter is combined in a multiplexer 506 with a predetermined programmable parameter $C_{len\_Linear}$. A selected B(i) parameter is combined in a multiplexer 508 with a predetermined programmable parameter $C_{len\_Const}$. The output of MUX 506 is connected to one input of a multiplier 510. The second input to multiplier 510 comes from a finite state machine (FSM 512. The outputs of multiplier 510 and MUX 508 are applied as inputs to an adder 514. Adder 514 generates at its output:

$$C_{len}=C_{len\_Linear}*\text{tap}+C_{len\_Const}$$

and $$\text{Threshold}\_PWL=A[i]*\text{tap}+B[i] (i=0,1,2,3)$$

In one example, A(i) and B(i) are programmable parameters. They are multiplexed to the input of the multiplier and adder during the channel diagnostics depending on the current tap number and which group this tap belongs to. By doing that, resource-sharing of the same multiplier and adder combined is possible, which makes the ASIC design very efficient. Furthermore, this combined multiplier and adder is also used to compute the cable length polynomial for reporting the length to a cable fault. To achieve this optimization of logic design, time-sharing is used to schedule the resource sharing depending on the state of the cable diagnostic state-machine.

The parameters of A(i) and B(i) estimated from the PWL method usually require more than 8-bits to represent and they are also signed numbers. In order to fit this unsigned 8×8 multiplier and 17-bit adder structure, a two-step scaling method is used. The sign of A(i) and B(i) (A(i)<0, B(i)>0) is changed when programming these two parameters for the system. The sign of the final output of the multiplier and adder output is then inverted. This is a very efficient way to implement the arithmetics for both PWL threshold computation as well as cable length computation by sharing the same multiplier and adder logic.

In an example operational scenario, transceivers 108a and 110a attempt to establish a valid communication link between themselves, to enable communication over the valid link (and communication channel 106a). To do this, transceivers 108a and 110a traverse a communication link setup protocol. Typically, this includes exchanging initial hand-shaking signals, and verifying a valid link has been established, as would be apparent to one skilled in the relevant art(s).

When a valid link exists, filter coefficients w(0)-w(N-1) (collectively referred to as filter coefficients w(i)) have properly converged to settled coefficient values. That is, filter coefficients w(i) have had sufficient time to adapt to, and therefore indicate, the characteristics and/or conditions of communication channel 106a. Thus, converged coefficients provide useful information about communication channel 106a.

A valid link may not exist between link partner transceivers 108a and 110a. For example, there may be a fault, such as a break, in communication channel 106a, or transceiver link partner 110a may not be connected to the communication channel. When a valid link does not exist, filter coefficients w(i)can be in an indeterminate (non-converged) state, thus providing little or no useful information about channel 106a.

When no valid link is detected, the user will initiate the diagnostic sequence. In this case, a signal is transmitted over transmit path 202. A copy of the transmitted signal is sent to fault detection circuit 218. The transmitted signal is delayed in registers 306 corresponding to the taps in the cable.

The received signal R[n] is a series of discrete sampled time signals. R[n] is the sampled output of ADC 216, indexed by time periods "n". ADC 216 samples the reflection from the receive channel and outputs R[n]. Signal R[n] comprises one input of summation node 302. The output of node 302 is error signal Error[n]. Error signal Error[n] is fed back to LMS adapter 304 of Echo Canceller 222, where it is combined with outputs from delay registers 306a-306n. The output of LMS adapter 304 is then combined with the outputs from delay registers 306a-306n and summed in summer 310. The output of summer 310 is combined in multiplier 226 with a fixed gain factor G. The output of multiplier 226 is then applied to summation node 302 where it is subtracted from received signal R[n].

The EC tries to estimate the channel reflection. If the EC estimation is perfectly aligned with R[n], then $$\text{Error}[n]=0.$$

The error signal Error[n] supplies an input to the LMS algorithm of the EC to adjust the coefficients of the filter to perform channel modeling or channel estimation, according to the following equation:

$$\text{Echo output } Y(n)*G \rightarrow R[n]$$

where Y[n] is the output of EC 222 and G is a programmable fixed gain value.

Initially, it is not known what the actual echo response will be. Therefore, the coefficients of the filters may all be zero. At this point, Y(n)=0, and the echo output will be zero. The error will be large because R[n]−Echo output=R[n]=Error[n].

Initially, therefore, Error[n] will equal R[n] and be large. Error[n] is applied to the LMS adapter 304 and the filter coefficients are adjusted according to the LMS algorithm. The filters combine the LMS adapter output (i.e., Error[n]) with reference signals (i.e., the transmit signals) to produce updated filter coefficients. The echo response at different cable lengths is equivalently modeled by the filter coefficients w(0)-w(n-1). This provides the profile of the channel Echo response. After sufficient iterations, the echo coefficients will converge so that the Echo Canceller will generate a good estimation of the real time reflection of the transmitted signals and the error signal will approach zero.

Each filter coefficient w(i) represents the return from different points on the cable. In this way, it is possible to determine the location of a fault when the reflected signal falls outside the normal coefficient boundaries.

One reason for using EC 222 in cable diagnostics is to reduce Error[n] close to zero. Different cable conditions will produce different echo responses. EC 222 tries to estimate the echo responses by comparing its output with the ADC sample output R[n] (the digitized reflection signals corresponding to the delayed cable echo response). EC 222 uses the difference between the ADC sample and the EC output as an error signal to adapt the coefficient of the filter. The gain G is chosen to be a value that will avoid overflow issues. Typically, G can have a value of 2 or 4, although any appropriate value can be used, as would be apparent to one skilled in the relevant arts.

To determine a fault in the cable, it is sufficient to compare the converged reflection coefficient with a known reference for a good cable at each tap along the cable. This determines the threshold at each tap.

It may be useful to determine cable length. A complete cable may be made up of multiple sections. For example, one section runs from the computer to the wall tap. A second section runs from the wall tap to a router. A third section may run from the router to a server. By knowing cable length, one can determine which connector may be bad, assuming it is one of the connectors that is bad. Then it may be only necessary to repair the connector instead of having to replace the entire cable. Alternatively, if one segment of the cable is bad, then by knowing the length of the cable at the break point, it is possible to merely replace that segment instead of replacing the entire cable.

Even good cables with no faults generate reflections at their termination. These reflections can be detected by searching from the last tap for any coefficients that are above the predetermined threshold settings for good cable length detection, and the cable length can be determined from that measurement.

Short Between Pairs Fault Detection

A cable of the type to which this invention is directed generally comprises four pairs of twisted wires. If the wires of a given pair are broken, a relatively large reflection will occur. Alternatively, if the wires of a given pair are shorted to each other, a similar, relatively large reflection will occur. However, if a wire of one pair is shorted to a wire of a second pair, a much smaller reflection will occur, although that reflection will still be larger than the normal residual reflection of a good cable. In general, the short between pairs reflection will be about 25% smaller in value than an open/short reflection. It is desirable to detect a short between pairs that could affect operation of the cable.

One way to be able to detect a short between pairs is to lower the threshold to a value below that of the short between pairs reflection. One of the problems associated with using a low threshold is what is known as "tap noise". Tap noise comprises variations in reflections due to different characteristics of cables and different gain settings.

For large reflections it is desirable to set a high threshold to reduce the effect of path noise and low level reflections. The equation is:

$$C_b(i) \pm \Delta C_1 > \text{threshold} > C_g(i) \pm \Delta C_2$$

$\Delta C_1$ and $\Delta C_2$ are functions of the conditions of the cables. $\Delta C_1$ is a coefficient tap noise when the cable is broken and $\Delta C_2$ is a coefficient tap noise when the cable is good. These two coefficients may be different. These are functions of the reflection in the cables. The optimum threshold setting is accomplished by using different settings for a simple open/short and for a short between pairs. The same reflection value occurs whether the pair is open or the pair is shorted (within a pair).

The process proceeds as follows.
1. First examine each pair of wires of the cable using the high threshold detection to determine if there is a simple open/short.
2. Once an open/short is found the process stops looking for additional open/shorts.
3. If no open/short is found, the threshold level is changed (lowered) and the gain of PGA 214 is increased to check for a short between pairs.
4. To check for a simple open/short it is only necessary to look at both wires of a single pair at any one time.
5. To check for a short between pairs it is necessary to check two pairs at a time.

Because the threshold level has to be set very low when checking for shorts between pairs, there is a lower level of confidence that a short will be detected. False readings are more likely to occur when looking for shorts between pairs because the reflection of the short may be mixed with noise levels. Therefore multiple readings should be taken to raise the confidence level that a short has been detected. The reflection in a short between pairs situation should normally be higher than normal noise, but this is not always the case.

Figure 7:
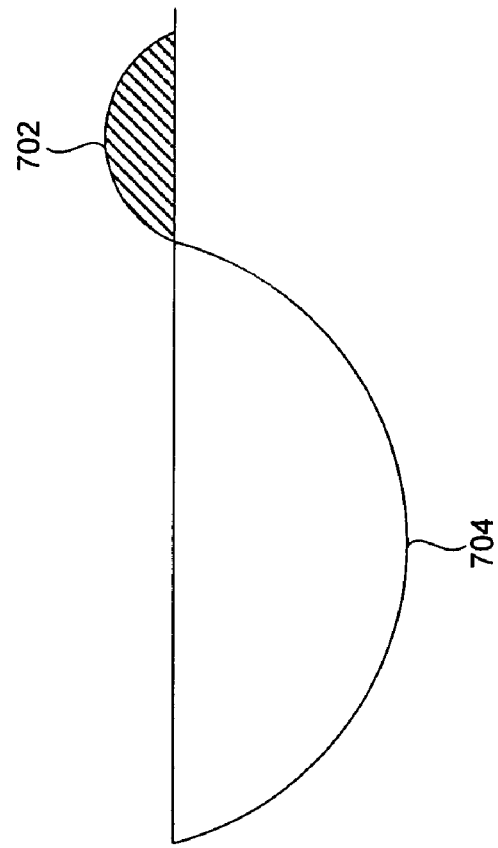
FIG. 7 shows a shorted cable fault.
Figure 6:
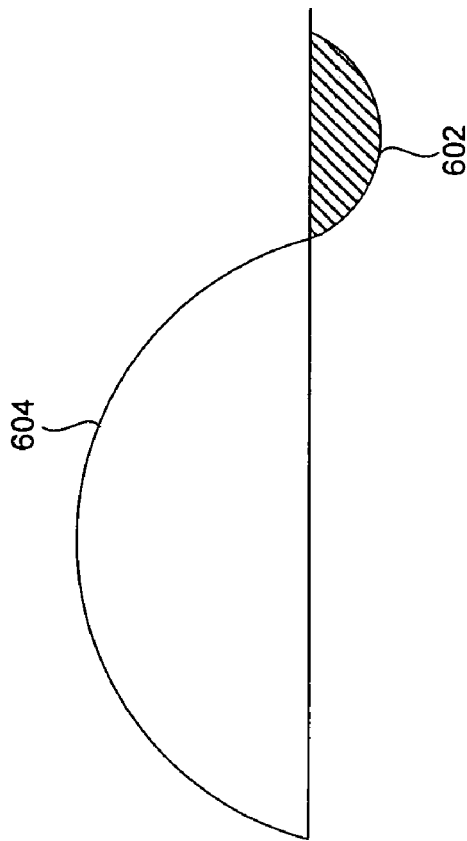
FIG. 6 shows an open cable fault.

The confidence level can be raised by detecting the signature of the reflection. FIGS. 6 and 7 show an open reflection signature and a short reflection signature, respectively. The portion 602 of the wave 604 below the axis in the open reflection (FIG. 6) and the portion 702 of the wave 704 above the axis in the short reflection (FIG. 7) are called the tails. These are the signature portions of the reflection. A reflection from a termination or from normal line noise will not have the signature tails of a reflection from an open/short.

The combined process for detecting open/short faults and shorts between cables is described below.

Figure 8:
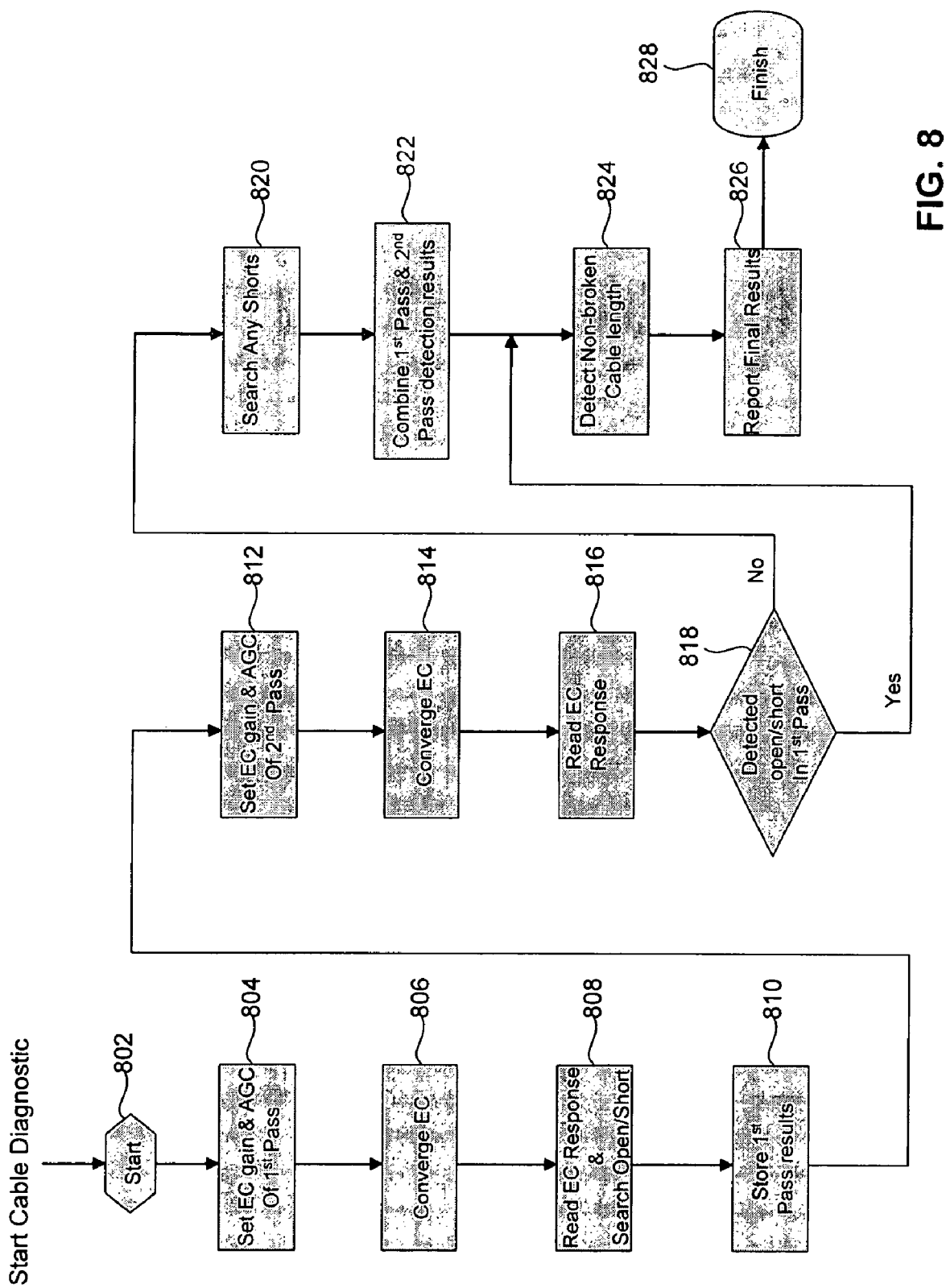
FIG. 8 is a flow chart of the cable diagnostic method.

FIG. 8 is a flow chart showing the combined process for determining open/short faults and short between pairs faults. Each cable comprises 4 twisted pairs of wires. A short between pairs means that one wire of one pair is shorted to one wire of a second pair.

A goal is to optimize the EC gain and gain setting of the PGA for the first pass to detect open/short faults and then for the second pass to detect only a short between pairs. In step 804, the EC gain and AGC are programmed to set the optimal gain for the PGA. In step 806, after setting the gain, "idle" data is sent through each twisted cable pair to detect the reflection. The EC is an adaptive filter coupled to each of the four channels in the cable. The EC knows the data sent to the channel pairs. The EC looks at the sampled reflection data coming back from each pair after the data is processed by the PGA and ADC. By looking at the sampled reflections, the EC can adapt itself so that the filter coefficient will be matched with the reflections from each tap along the cable. At the same time, the EC will adapt and converge to the channel's response to the reflection.

The cable can be thought of as a tapped delay line. The tapped delay line is modeled as a finite impulse response (FIR) filter. The EC is also modeled as an FIR filter. Each tap coefficient corresponds to the reflection from the corresponding tap. The echo will converge so that it mimics the echo response from the same cable. Therefore, after convergence the whole characteristic of the reflection of the cable is known. At step 808, the echo response is read. What this means is that it is the echo coefficient of each pair that is read. A search is performed to determine whether an open/short exists. A search for open/short means that each tap coefficient is compared to a predetermined threshold. If the tap coefficient is greater than the threshold, this is indicative of an open/short fault. A positive coefficient sign is indicative of an open fault. If the sign of the coefficient is negative, this means that the fault is a short within a pair.

At step 810 the results of the first pass search are stored in the internal registers. At step 812, the EC gain and AGC of the PGA are optimized to a new set of coefficients having a lower threshold than the coefficients of the first pass to enable detection of either a short between pairs or channel termination. In both cases, the reflection will be much lower than the reflection from an open/short fault. If the gain threshold is set too high, that is, it is kept at the same level as the first pass, the reflection will be below this threshold and the system will not detect a short between pairs or a channel termination.

A second test signal is then sent along the cable into each pair of wires and the reflections are converged at step 814 to read the echo response in step 816.

Step 818 is a decision point. If the open/short search at step 808 has detected an open/short fault, then there is no need to search for a short between pairs. In that case, the process proceeds directly to step 824 to determine the unbroken cable length, that is, the length of the cable from its start point up to the location of the open/short fault. This is determined by determining the tap number at which the tap coefficient is above the first predetermined threshold, representing the detected open/short fault. At the same time, the system will determine the total cable length, based on detection of reflections from the good (non-faulty) cable pairs. A report of the diagnostic findings is reported to the user at step 826 and the process finishes at step 828.

If no open/short fault was detected on the first pass, then the process proceeds to step 820 to search for a short between pairs based on the results of the second pass. The results of both the first and second passes are then combined at step 822. The non-broken cable length is then determined at step 824. If no fault has been detected, the result will be a report of a good cable and its length. If a fault has been detected, the diagnostic system will issue a report indicating the total cable length and the type and location of the fault.

It should be noted that the algorithms for determining total cable length and fault location are different. The algorithm for detecting a cable fault starts with tap 0 and proceeds forward to tap N. In one example, N=190. However, it will be apparent to one skilled in the relevant art that N can be any suitable number, depending on such factors as the length of the cable and the accuracy of measurement that is desired. The algorithm for detecting total cable length, on the other hand, proceeds back to the source from tap N.

Another issue that needs to be considered is the fact that, when measuring cable length, the reflection will be quite small. PGA 214 must therefore be adjusted to allow measurement of the reflection over the tap noise. If the signal is small, the echo canceller may not be able to adapt sufficiently to measure a small reflection such as occurs with cable length detection and short between pairs faults.

The embodiments of this invention can use VLSI microarchitecture design to implement the PWL approximation algorithm and resource-sharing with the similar arithmetic computation of cable length polynomial.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks and modules can be implemented by discrete components including digital and/or analog circuits, application specific integrated circuits, processors executing appropriate software, hardware, firmware and the like or any combination thereof. Thus, the breadth and scope of the present invention should not be limited by any of the above-described exemplary embodiments, but should be defined only in accordance with the following claims and their equivalents.

What is claimed is:

1. A method for detecting the location of a fault in a cable, comprising:
   a) transmitting a signal on the cable;
   b) receiving a reflected signal from the cable;
   c) converging a plurality of echo canceller coefficients based on the reflected signal, wherein each echo canceller coefficient corresponds to a respective tap of a plurality of taps of an echo canceller;
   d) determining a threshold of a given tap of the plurality of taps using a piecewise linear function of a tap number associated with the given tap;
   e) comparing the threshold of the given tap to a value of a corresponding echo canceller coefficient;
   f) if the value of the corresponding echo canceller coefficient is greater than the threshold of the given tap, then determining a location of a cable fault based on the tap number associated with the given tap; and
   g) performing steps d)-f) for each remaining tap of the plurality of taps.

2. The method of claim 1, wherein step d) comprises taking the sum of a first programmable parameter and the product of a second programmable parameter and the tap number.

3. The method of claim 1, wherein the determining the location in step f) comprises taking the sum of a first programmable parameter and the product of a second programmable parameter and the tap number.

4. The method of claim 2, wherein the first programmable parameter is selected from among a plurality of programmable parameters based on the tap number.

5. The method of claim 2, wherein the second programmable parameter is selected from among a plurality of programmable parameters based on the tap number.

6. A method for detecting the location of a fault in a cable, comprising:
   a) transmitting a first signal on the cable;
   b) converging a plurality of echo canceller coefficients based on a first reflected signal received from the cable, wherein each echo canceller coefficient corresponds to a respective tap of a plurality of taps of an echo canceller;
   c) determining a threshold of a given tap of the plurality of taps using a first piecewise linear function of a tap number associated with the given tap;
   d) when the threshold of the given tap is greater than a value of a corresponding echo canceller coefficient, then determining a location of a cable fault based on the tap number associated with the given tap; and
   e) when the threshold of the given tap is not greater than the value of the corresponding echo canceller coefficient, then
      (1) converging a plurality of second echo canceller coefficients based on a second reflected signal received from the cable, wherein each second echo canceller coefficient corresponds to a respective tap of the plurality of taps of the echo canceller,
      (2) determining a second threshold of the given tap using a second piecewise linear function of the tap number associated with the given tap,
      (3) when the second threshold of the given tap is greater than a value of a corresponding second echo canceller coefficient, then determining a location of a cable fault based on a tap number associated with the given tap.

7. The method of claim 6, wherein step c) comprises taking the sum of a first programmable parameter and the product of a second programmable parameter and the tap number.

8. The method of claim 7, further comprising:
   performing steps c)-d) for each remaining tap of the plurality of taps.

9. The method of claim 7, wherein the first programmable parameter is selected from among a plurality of programmable parameters based on the tap number.

10. The method of claim 7, wherein the second programmable parameter is selected from among a plurality of programmable parameters based on the tap number.

11. The method of claim 6, wherein step e)(2) comprises taking the sum of a first programmable parameter and the product of a second programmable parameter and the tap number.

12. The method of claim 11, wherein the first programmable parameter is selected from among a plurality of programmable parameters based on the tap number.

13. The method of claim 11, wherein the second programmable parameter is selected from among a plurality of programmable parameters based on the tap number.

14. An apparatus for detecting a location of a fault in a cable, comprising:
   means for receiving a reflected signal from the cable;
   means for converging a plurality of coefficients based on the reflected signal, wherein each coefficient of the plurality of coefficients corresponds to a respective tap of a plurality of taps;
   means for determining a plurality of thresholds using a piecewise linear function of a tap number, wherein each threshold is determined based on a tap number of the respective tap of the plurality of taps;
   means for comparing a threshold of the plurality of thresholds to a coefficient of the plurality of coefficients, wherein the threshold was determined based on a tap number of the respective tap corresponding to the coefficient; and
   means for determining a cable fault location based on a tap number of a given tap of the plurality of taps when the threshold corresponding to the given tap is greater than the coefficient corresponding to the given tap.

15. The apparatus of claim 14, further comprising:
   means for transmitting a signal on the cable.

16. The apparatus of claim 14, wherein the means for determining a plurality of thresholds comprises means for summing a first programmable parameter and a product of a second programmable parameter and a tap number.

17. The apparatus of claim 16, wherein the means for determining a plurality of thresholds comprises a means for selecting the first programmable parameter from among a plurality of programmable parameters based on the tap number.

18. The apparatus of claim 16, wherein the means for determining a plurality of thresholds comprises a means for selecting the second programmable parameter from among a plurality of programmable parameters based on the tap number.

* * * * *

UNITED STATES PATENT AND TRADEMARK OFFICE
CERTIFICATE OF CORRECTION

PATENT NO. : 7,627,026 B2  Page 1 of 1
APPLICATION NO. : 11/094318
DATED : December 1, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Second Day of November, 2010

David J. Kappos
*Director of the United States Patent and Trademark Office*